United States Patent
Åkerberg

Patent Number: 6,046,993
Date of Patent: Apr. 4, 2000

[54] METHOD TO ADAPT A SYNCHRONOUS TRANSMISSION

[75] Inventor: Dag E:son Åkerberg, Kungsägen, Sweden

[73] Assignee: Telefonaktiebolaget LM Ericsson, Stockholm, Sweden

[21] Appl. No.: 08/793,301
[22] PCT Filed: Sep. 7, 1995
[86] PCT No.: PCT/SE95/01006
§ 371 Date: Mar. 12, 1997
§ 102(e) Date: Mar. 12, 1997
[87] PCT Pub. No.: WO96/08901
PCT Pub. Date: Mar. 21, 1996

[30] Foreign Application Priority Data

Sep. 12, 1994 [SE] Sweden .................................. 9403036

[51] Int. Cl.[7] .................................................. H04B 7/212
[52] U.S. Cl. ........................ 370/345; 455/450; 455/454; 370/504
[58] Field of Search .................................. 370/252, 330, 370/344, 345, 346, 347, 461, 462, 504; 455/62, 63, 450, 452, 454, 455

[56] References Cited

U.S. PATENT DOCUMENTS

| | | | |
|---|---|---|---|
| 4,987,571 | 1/1991 | Haymond et al. | 370/462 |
| 5,142,691 | 8/1992 | Freeburg et al. | 455/63 |
| 5,267,244 | 11/1993 | Messerschmitt et al. | 370/342 |
| 5,553,076 | 9/1996 | Behtash et al. | 370/347 |
| 5,627,823 | 5/1997 | Pillekamp | 370/330 |

FOREIGN PATENT DOCUMENTS

WO 94/10811  5/1994  Germany.

OTHER PUBLICATIONS

Dag Åkerberg, "Novel Radio Access Principles Useful for Third Generation Mobile Radio Systems", The Third IEEE International Symposium on Personal, Indoor and Mobile Radio Communications, Oct. 19–21, 1992, The Westin Hotel, Boston, Massachusetts, pp. 1–10.

Primary Examiner—Chi H. Pham
Assistant Examiner—Frank Duong
Attorney, Agent, or Firm—Burns, Doane, Swecker & Mathis, L.L.P.

[57] ABSTRACT

A method of adapting synchronous transmission to the rules that apply to asynchronous transmission in a radio medium. In asynchronous transmission, the transmitter/receiver operates in monitoring mode for a given short period of time, in order to establish whether or not transmission will take place. The synchronous transmission is, for example, a TDMA transmission for a personal telephone system active over short distances (10–200 m). According to the method, the radio medium is monitored by a synchronous transmitter over a brief time period between two time slots and the power received is measured and compared with a given prescribed threshold power in accordance with asynchronous rules. Permission to transmit can be given on the basis of the result of this comparison.

5 Claims, 2 Drawing Sheets

Fig. 3  Synchronous
PRIOR ART
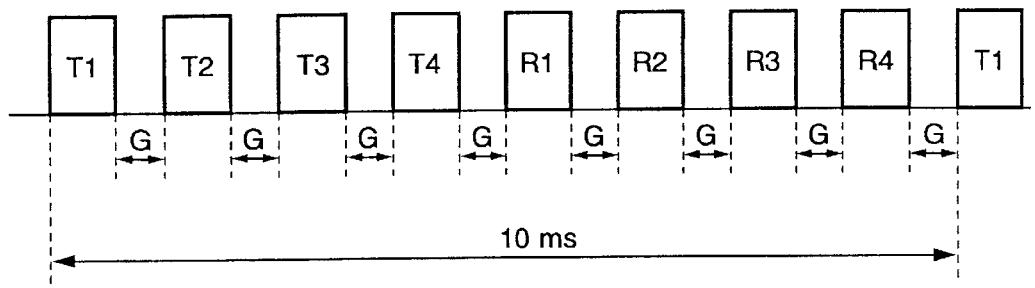
Fig. 4  Asynchronous
PRIOR ART
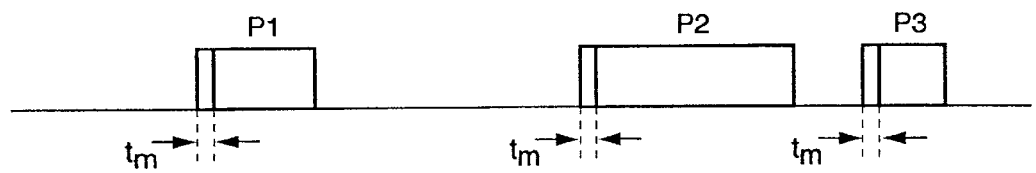
Fig. 5
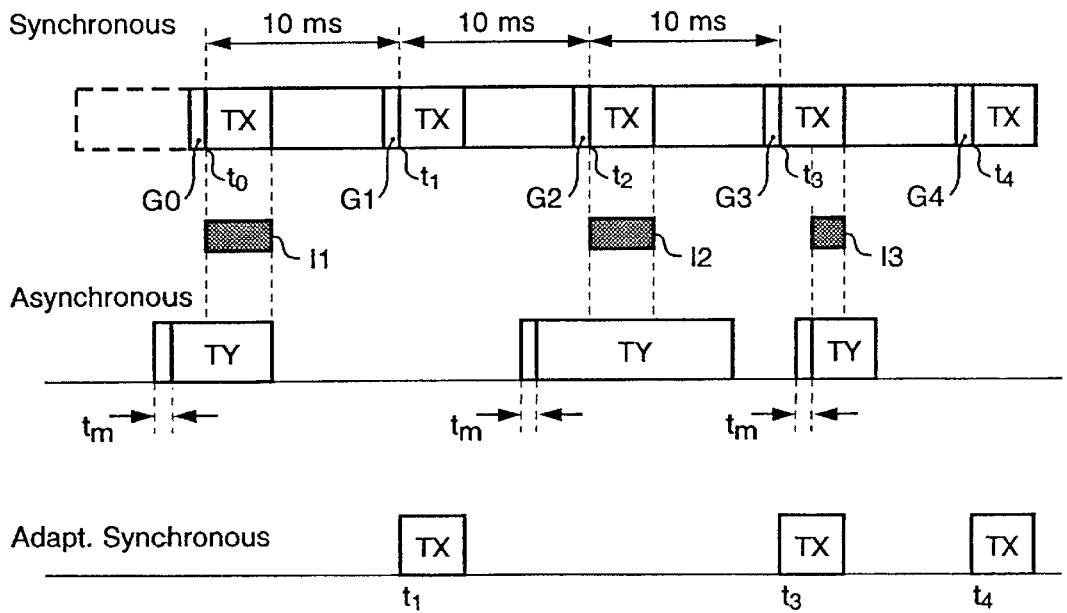

METHOD TO ADAPT A SYNCHRONOUS TRANSMISSION

BACKGROUND

The present invention relates to a method pertaining to synchronous radio transmission. More specifically, the invention relates to a method for synchronous transmission over a frequency band where asynchronous transmission rules are applied. The synchronous radio system may be a DECT-type system, i.e. a relatively short-range cordless personal communication system, which shall be adapted with comply to the rules for asynchronous transmission, for instance a so-called packet-switched data transmission with retained synchronism.

In radio communication technology it is common to distinguish between asynchronous and synchronous transmission.

Traditionally, radio communication has been developed for circuit-switched synchronous services, such as mobile telephones and cordless telephones for speech communication and ISDN services. A common feature of these types of system is that information is transmitted to a given receiver within given specific time points in a time-divided system or over a certain radio frequency, a frequency-divided system. An example of time-divided systems are the so-called TDMA systems (Time Division Multiple Access), in which information is transmitted in time slots with determined periodic time spacing for each channel.

Radio systems using asynchronous transmission normally utilize so-called packet switching over a certain radio frequency, although these packets are transmitted and received totally at random from one transmitter-receiver to another transmitter-receiver.

An example of asynchronous systems is found in so-called Local Area Data Networks, which utilize packet-data switching via radio instead of via a circuit-switched radio medium.

A certain frequency spectrum has been reserved for asynchronous radio transmission (e.g. a frequency spectrum of 1910–1920 MHz allocated by the Federal Commission, FCC, in the U.S.A.). This enables short access times to be obtained for asynchronous packet transmission.

In asynchronous transmission, several users share the same frequency spectrum thereby obviating the need for frequency planning. Collision occurs at times resulting in a congestion in the network between two users, although the intended data packet is retransmitted. The retransmission of data packets at certain time points after transmitting an asynchronous data packet is known to the art; see for instance the disclosures made in SE-A-9302067-5.

Synchronous or periodic transmission involves sending and receiving information at predetermined time points and/or over certain determined frequencies, as in the case of the TDMA systems mentioned in the introduction. In the case of the above example from American standards having a frequency band of between 1910 and 1920 MHz in the case of asynchronous transmission, a band between 1920 and 1930 MHz is intended for synchronous transmission. These two bands shall thus be used separately of one another.

SUMMARY

One drawback with asynchronous transmission is that it is not suitable for use in the same system or in the same environment as those services that are offered in the synchronous radio networks, because of the risk of interference and disturbances from the asynchronous transmission. In particular, asynchronous transmission is not suitable for easy inclusion in an integrated services digital network ISDN. It is already known to support synchronous services in an asynchronous medium with the aid of so-called ATM (Asynchronous Transmission Mode). In this application, data received asynchronously is collected during a time period in a buffer memory on the receiver side, whereafter data collected in this memory is transmitted under the control of a synchronous clock. This time period must have sufficient duration to enable any retransmissions that have to be made because of collisions before the reconstructed bit stream is clocked-out synchronously. This enables the asynchronous transmission to transmit synchronous services.

Although the known method functions well, a delay is caused by the memory function. An excessively long delay cannot be tolerated in the case of speech transmission. In order to maintain a short delay (approx. 10 ms), there is required a very high bandwidth in the case of radio transmission, in general higher than 40 MHz when a plurality of users shall coexist in one and the same frequency spectrum.

On the other hand, it is suitable to use one and the same radio system for both synchronous and asynchronous services, one service utilizing one-half (1920–1930 MHz) of the allocated frequency band and the other service utilizing the other half (1920–1930) of the same band. However, this has the drawback of unnecessarily limiting synchronous transmission capacity, because it only utilizes one-half of the band allocated to the over all system (as a whole). In turn, this means that the base station density must be made greater in the radio system with more compact retransmission of the access channels.

It is therefore desirable to be able to utilize the whole of the band for synchronous transmission.

The present invention provides a method of adapting the synchronous transmission of services to the rules for asynchronous radio transmission. The novel method does not cause exaggerated delays, even when the allocated spectrum is small (5–20 MHz).

Thus, the object of the present invention is to provide a method for synchronous radio transmission over short distances which complies with asynchronous transmission rules within an allocated frequency band.

The synchronous radio transmission has a given periodicity for transmission of information. For instance, in the case of a DECT-type paging system, information is transmitted in frames in accordance with the TDMA principle, wherein a given frame contains a number of time slots for transmission from a number of users, and the same number of time slots for receiving information in respective users. Thereafter follows the next frame. A standardized guard time is included between two mutually sequential time slots in the frame for different users. According to the present invention, this guard time is used to ascertain whether or not the transmission in the next following time slot can be carried out in accordance with the asynchronous rules.

The invention is characterized by the features set forth in the following claim.

BRIEF DESCRIPTION OF THE DRAWINGS

The invention will now be described in more detail with reference to the accompanying drawings, in which

FIG. 3 illustrates an example of a time diagram relating to previously known synchronous radio transmission, for transmitting and receiving;

FIG. 4 illustrates in a similar fashion known asynchronous radio transmission, but solely in the transmitting mode;

FIG. 5 is a time diagram similar to those shown in FIGS. 2 and 3 and is intended to explain the inventive method.

DETAILED DESCRIPTION

Figure 1:
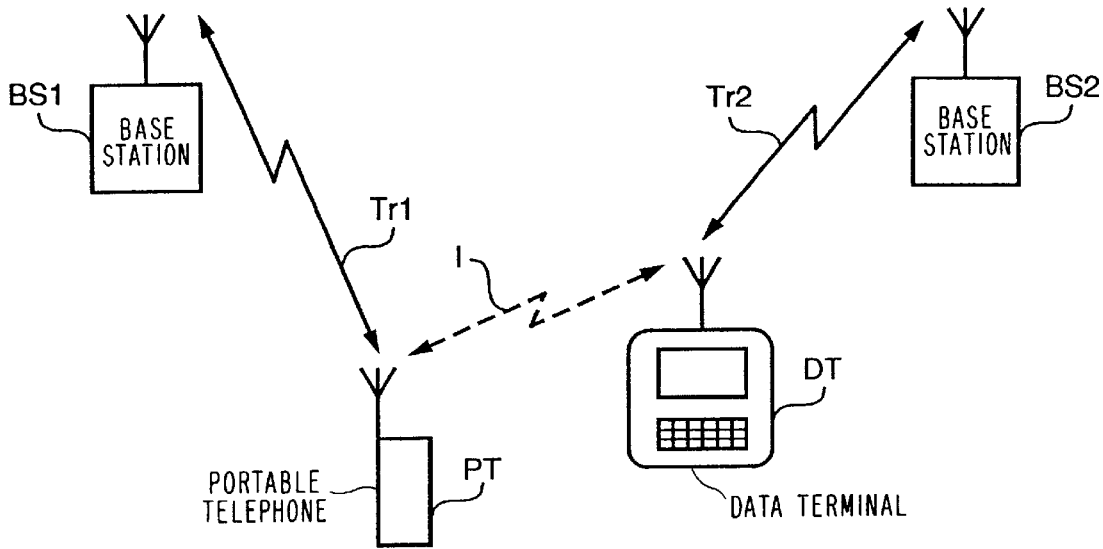
FIG. 1 is a block diagram illustrating a known radio system which includes both synchronous and asynchronous radio transmission within one and the same geographical area.

FIG. 1 is a simplified block diagram illustrating a system for synchronous and asynchronous radio transmission. In the illustrated case, the radio systems includes two base stations BS1 and BS2 which communicate with two mobile subscribers, of which one is a portable telephone apparatus PT and the other is a mobile data terminal DT. The two terminals PT and DT are located in the vicinity of one another geographically, and are therefore liable to interfere with one another. For instance, the two apparatus/terminals may be installed in one and the same place in an office building. They may also be placed at a short distance from one another within the same building. Both terminals are located at a short distance from the base stations BS1 and BS2. By "short distance" is meant in this connection a distance of from 10 to 200 m, i.e. a much shorter distance than the maximum distance at which a mobile subscriber in a cellular system will probably be located from a base station (up to 30 km).

The one transmission Tr1 is synchronous and is used by the portable telephone PT. This telephone transmits to the synchronously operating base station BS1 and receives radio signals from said base station within a given frequency band and time-divided in accordance with the TDMA principle. Thus, in addition to a given frequency spectrum being reserved for synchronous transmission, a given time slot in each frame is also reserved for transmitting from the terminal PT and a time slot for receiving a certain time period after transmitting in the same frame (see FIG. 3). The base station BS1 is able to communicate synchronously with other portable telephone apparatus, not shown.

The other transmission Tr2 is an asynchronous transmission which uses the data terminal DT. This terminal transmits to the asynchronous operating base station BS2 and receives radio signals from this base station within a certain frequency band, but randomly in time instead of periodically as in the case of terminal PT. As with the base station BS1, radio signals are transmitted and received by the base station BS2 within a given frequency band. The transmission Tr2 may be a packet-switched data transmission, for instance.

The base stations BS1 and BS2 may be located within or outside the building and are physically connected to a private or public switched network (not shown) by means of telephone wires.

Figure 2:
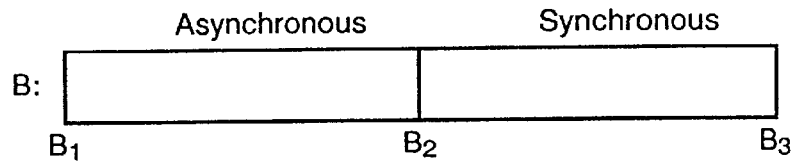
FIG. 2 illustrates schematically a frequency spectrum allocated to a radio system according to FIG. 1.

FIG. 2 is a schematic illustration of the two frequency bands for the synchronous and the asynchronous transmission Tr1, Tr2. Only asynchronous transmission Tr2 occurs between the band limits B1, B2, and only synchronous transmission Tr1 occurs between the band limits B2–B3. In the U.S.A., these band limits have been specified at 1910–1920 MHz and 1920–1930 MHz respectively. The drawback with this division is that only one-half of the total bandwidth B1–B3 is accessible for respective synchronous and for asynchronous transmissions, as mentioned in the aforegoing.

FIG. 3 illustrates the known principle of transmitting radio signals in accordance with TDMA techniques, this transmission being periodic or synchronous. In this case, TDMA transmission in a DECT system for personal radio communication (standardized by ETSI) is shown by way of example. According to this standard, transmission is effected in a frame of length 10 ms and reception is effected during the next following frame over a duration of 10 ms. According to this standard, each frame shall contain twelve time slots, although only four time slots have been shown in the transmitting and receiving frames in FIG. 3, for the sake of simplicity. An essential feature of the inventive method is the provision of a guard space between two sequentially following time slots in accordance with the standard, i.e. a brief guard time of 30 $\mu$s is included so as to prevent a burst in one time slot from entering a following time slot as a result of mutually different propagation times of the two bursts, among other things. FIG. 4 is a time diagram relating to asynchronous transmission in a packet data system, for instance the base station BS2 and the data terminal DT in FIG. 1. Data packets P1, P2 and P3 containing information and addressed to a certain receiver are sent at certain time points. According to asynchronous transmission rules, a short time period tm during which monitoring takes place is included before each data packet, for instance before the packet P1. During this monitoring period, the transmitter measures the signal strength on the intended channel to establish whether or not the channel is free from other transmissions, which can be ascertained by measuring the power in the receiver. If the power is found to be below a given level, specified by the aforesaid rules, the channel is considered to be free for a given limited length of time (10 ms) immediately after the measuring period tm. Transmission is therefore effected during this period, or a part of said period, on the frequency of the intended channel within the frequency band B1.

According to the present invention, the brief guard time G between two transmission time slots in the synchronous transmission Tr1 is used to meet the fundamental rule in asynchronous transmission which decrees that prior to each transmission a short time period must be free before the transmitting a time-limited packet within the transmission period. The short time period is normally much shorter than a time slot in a synchronous system.

Figure 6:
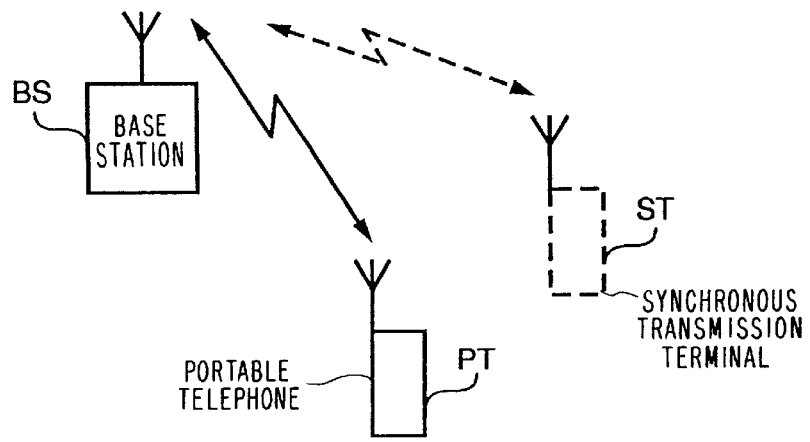
FIG. 6 is a simplified block diagram analogous with FIG. 1, illustrating only synchronous transmission adapted in accordance with the invention.

FIG. 5 is a time diagram illustrating the principles of the method, and FIG. 6 illustrates a single synchronous-transmission terminal PT which although similar to the terminal PT in FIG. 1 is adapted to asynchronous rules in accordance with the inventive method.

The upper part of FIG. 5 illustrates synchronous transmission in accordance with FIG. 3, with four mutually sequential transmission time slots for one and the same transmitter. The time slots are spaced apart by a distance corresponding to 10 ms, within which spaces remaining transmission time slots and an equal number of receiving time slots are accommodated. For a given transmitter/receiver which transmits during a given transmission time slot TX, e.g. T1 in FIG. 3, and retransmits in the next following time slot TX, a silent period is included during the transmission time slots T2–T4 and the reception time slots R1–R4 and corresponding guard times G in FIG. 3.

In the FIG. 5 illustration, it is assumed that synchronous transmission is begun with transmission in the allocated time slot TX at time to. Prior to this, the corresponding guard time Go has been utilized during the brief monitoring period to measure the power emanating from prevailing interference created by some other system, such as the power received in the receiving part of the synchronous terminal PT shown in FIG. 6.

As shown in FIG. 5, the asynchronous transmission is assumed to take place during the time periods TY. This transmission interferes with the synchronous transmission TX during time periods I1, I2 and I3. The asynchronous transmission is monitored during the guard time G immediately preceding a given allocated transmission time slot TX, e.g. the time slot T1 of the FIG. 3 illustration. Thus, the power from the asynchronous transmission Tr2 is measured during the guard time G1, as it is received in the receiving part of the synchronous terminal P7 shown in FIG. 1. The terminal PT shown in FIG. 1 thus measures the interference I delivered thereto from the data terminal DT, by measuring the power of the radio signal from the terminal DT and during the whole of the guard time G1, or during a part thereof.

In the case of the FIG. 5 example, no interference is observed when measuring during the guard time G1, and consequently transmission is carried out during the following transmission time slot TX starting at time t1.

A further measurement is taken during the guard time G2, prior to the time slot which starts at time t2. In the case of the illustrated example, this further measurement indicates that asynchronous transmission is in progress, but because the measuring process is in progress for a short period during the guard time G2 the synchronous transmission is unable to determine the length of the asynchronous transmission. The synchronous transmission is inhibited due to the interference I2 from the transmission TY, which also appears during the guard time G2.

Yet another measurement is taken during the guard time G3, prior to the time slot which starts at time t3. In the case of the illustrated example, it is established that no asynchronous transmission is in progress. It is assumed that asynchronous transmission will not begin until later, although during a part of the time slot that starts at time t3, which cannot, of course, be established when measuring during the guard time G3. Consequently, the synchronous transmission is carried out even though it will be subjected to interference for a short period of time, in accordance with FIG. 5.

A new measurement is taken during the guard time G4 prior to the time slot which starts at time t4. In the case of the illustrated example, it is ascertained that no asynchronous transmission is in progress and consequently transmission is carried out in the same way as at time t1.

It is not possible to utilize a longer time period than the guard time G during the quiet period between two mutually sequential transmission time slots, because synchronous transmission can be in progress during another time slot, for instance the time slot T2 according to FIG. 3, from another synchronous transmitter. This other synchronous transmitter has been shown in broken lines in FIG. 6 and referenced ST. Thus, monitoring and measuring of possible interfering transmissions on the synchronous channel can only take place during the guard time G between two transmission time slots.

If the time G is not sufficient to meet a particular asynchronous standard, an alternative procedure is for the synchronous system to refrain from transmitting during certain time slots, for instance during each alternate time slot, and the guard time G can be made as long as a time slot.

Avoiding transmission during certain time slots is a solution to the case when the asynchronous rules require the spacing between two bursts from one and the same transmitter to have a smallest time separation, for instance a randomly chosen number between 50 and 400 µs.

After measuring the interfering radio signal from the asynchronous transmission in the synchronous receiver, the power of the interfering radio signal is compared in the receiver with a threshold value which relates to this power and which is stored in the receiver and has been determined in accordance with the rules for asynchronous transmission see the example below. If the measured power of the interfering signal is Pm and the threshold power (the so-called access threshold) is Pt, then transmission in the next following time slot is inhibited when Pm>Pt, and transmission in the next following time slot is permitted when Pm<Pt.

The result of the adapted synchronous transmission is shown at the bottom of FIG. 5. Measuring of the power of the interfering signal during the guard times Go and G2 and the comparisons made in the synchronous receiver showed the condition Pm>Pt and consequently no synchronous transmission took place in.corresponding time slots. Transmission takes place only in those time slots that begin at t1, t3 and t4.

The following numeral values are given as an example for a transmission with 10 MHz allocation:

Transmission bandwidth: Smaller than 10 MHz
Transmission power: Smaller than 100 MHz
Monitoring time prior to transmission: At least 30 µs
Monitored power level for permitted transmission: Lower than −90 dBm
Maximum length of transmission burst: 10 ms It will be understood that the inventive method is not limited to the aforedescribed exemplifying embodiment. For instance, it is not necessary to transmit in the time slot TX which immediately follows the monitoring and measuring process carried out during, e.g., the guard time G1 in accordance with FIG. 5, even though the measuring result should so permit. Instead, it is possible to hop over the frame and carry out a new monitoring process during the corresponding guard time G1 in the next frame or in some following frame. This alternative will ensure a still more positive interference-free synchronous transmission.

Neither is it necessary to measure just the power from the interfering transmission in the synchronous channel, since it is also possible to measure instead, e.g., the so-called C/I ratio, where C is the signal value in the synchronous channel and I is the value of the interfering signal from the asynchronous transmission in the synchronous channel. Naturally, this presumes that the synchronous rules have defined C/I measuring instead of, or as an alternative to, the measuring of power thresholds.

The inventive method solves the problem of transmitting synchronous services, for instance speech with a short delay, using a frequency band with rules for asynchronous transmission. since these synchronous services become sensitive to interference from a purely asynchronous system on the same frequency band, the main area in which the invention is applied is in offices or buildings that are controlled by a proprietor or owner. This means that only one type of system will be installed in each building or on each floor of a building.

What is claimed is:

1. A method for the synchronous transmission of radio signals over a frequency band within which rules for asynchronous transmission are applied and which is effected over short distances and periodically within time slots, wherein a guard time is reserved between two mutually sequential time slots in which no transmission takes place, comprising the step of monitoring the state of an allocated radio channel for transmission within said frequency band in accordance with asynchronous transmission during said guard time, wherein permission is given for synchronous transmission within a time slot that follows said guard time when a determination is made that the allocated radio channel is substantially free from transmissions during a monitoring time period $t_m$.

2. A method according to claim 1, further comprising the step of monitoring the state of the allocated radio channel for transmission within said frequency band, by measuring the signal power in the intended synchronous transmission channel, and comparing the value of the measuring power with a predetermined threshold value in accordance with a synchronous transmission criteria, wherein permission to transmit in the intended channel is given when the measured value is smaller than said threshold value by a given amount.

3. A method according to claim 1, wherein no transmission takes place in the time slot that immediately follows the guard time during which said monitoring process takes place, but in the nearest following time period providing that permission to transmit has been given with respect to this latter time slot.

4. A method according to claim 3, further comprising the step of measuring said power during the major part of said guard time.

5. A method according to claim 3, further comprising the step of measuring said power periodically in each of said brief time periods that precedes the periodic transmission in the synchronous transmission in said frequency band.

* * * * *